(12) United States Patent
Stevens

(10) Patent No.: US 6,445,778 B1
(45) Date of Patent: Sep. 3, 2002

(54) TELEPHONE TAG ENTERTAINMENT

(75) Inventor: Gilman R. Stevens, Fairview, TX (US)

(73) Assignee: Alcatel USA Sourcing, L.P., Plano, TX (US)

( * ) Notice: Subject to any disclaimer, the term of this patent is extended or adjusted under 35 U.S.C. 154(b) by 0 days.

(21) Appl. No.: 09/455,089

(22) Filed: Dec. 6, 1999

(51) Int. Cl.[7] ............................................. H04M 11/00
(52) U.S. Cl. ............................... 379/93.13; 379/90.01; 379/93.12; 379/88.18
(58) Field of Search .......................... 379/93.13, 90.01, 379/93.12, 102.01, 102.02, 102.03, 265, 266, 88.13, 88.17, 88.18, 88.23, 88.24, 88.25, 88.26

(56) References Cited

U.S. PATENT DOCUMENTS

| | | | | |
|---|---|---|---|---|
| 5,340,119 A | * | 8/1994 | Goldfarb | 379/93.13 |
| 5,403,999 A | * | 4/1995 | Entenmann et al. | 379/93.13 |
| 5,937,057 A | * | 8/1999 | Bell et al. | 379/265 |
| 5,949,869 A | * | 9/1999 | Sink et al. | 379/88.25 |
| 6,193,610 B1 | * | 2/2001 | Junkin | 463/40 |

* cited by examiner

Primary Examiner—Melur Ramakrishniah
(74) Attorney, Agent, or Firm—Anderson, Levine & Lintel; Richard A. Mysliwiec; V. Lawrence Sewell

(57) ABSTRACT

To alleviate the frustration of telephone tag, if the called party is unavailable (32), the calling party is offered the chance to participate in a game (36). The user can accept or reject the offer (38). If the offer is accepted, a game is played (40), if the offer is rejected, the calling party is connected to the called party's voice mail (42). The game could involve purchase of a lottery, participation in a guessing game, or participation in a knowledge-based game. After the game is played, the calling party is connected to the called party's voice mail (42).

20 Claims, 4 Drawing Sheets

TELEPHONE TAG ENTERTAINMENT

CROSS-REFERENCE TO RELATED APPLICATIONS

Not Applicable

STATEMENT OF FEDERALLY SPONSORED RESEARCH OR DEVELOPMENT

Not Applicable

BACKGROUND OF THE INVENTION

1. Technical Field

This invention relates in general to telecommunications and, more particularly, to a method and apparatus for providing entertainment in connection with voice messaging.

2. Description of the Related Art

The advent of voice mail has changed the way people communicate. On one hand, voice mail has allowed people to leave messages without third party intervention (such as a secretary). On the other hand, voice messaging tends to create a higher percentage of "telephone tag", where individuals leave messages for one another, but never actually connect.

Over time, telephone tag can become very frustrating. Eventually, one of the participants is likely to stop leaving messages. In particular, the consequences can be serious in a commercial setting, where a customer stops communicating with a company because of the aggravation of leaving messages instead of actually making contact with an individual.

It is unlikely that telephone tag can be avoided entirely. While mobile telecommunication devices have made connections available under more circumstances, they have not appreciably reduced the incidence of telephone tag; on the contrary, the increased availability of communications may well have similarly increased the number of incidences of telephone tag.

Accordingly, a need has arisen for a method an apparatus for making telephone tag more enjoyable.

BRIEF SUMMARY OF THE INVENTION

In the present invention, the frustration of telephone tag is alleviated by providing a voice mail system where, after receiving a call from a calling party to a called party, the calling party is offered the opportunity to participate in a game, if the called party is not available. If the calling party accepts, the game is played. The calling party is forwarded to the called party's voice mail either before or after the game is played.

The present invention provides significant advantages over the prior art. The frustration of telephone tag is alleviated by the opportunity to play a game, such as the purchase of a lottery ticket, or winning a discount coupon or other promotional item through a game of chance, or a game to gain access to a particular advertising media stream.

BRIEF DESCRIPTION OF THE SEVERAL VIEWS OF THE DRAWINGS

For a more complete understanding of the present invention, and the advantages thereof, reference is now made to the following descriptions taken in conjunction with the accompanying drawings, in which.

DETAILED DESCRIPTION OF THE INVENTION

The present invention is best understood in relation to FIGS. 1–5 of the drawings, like numerals being used for like elements of the various drawings.

Figure 1:
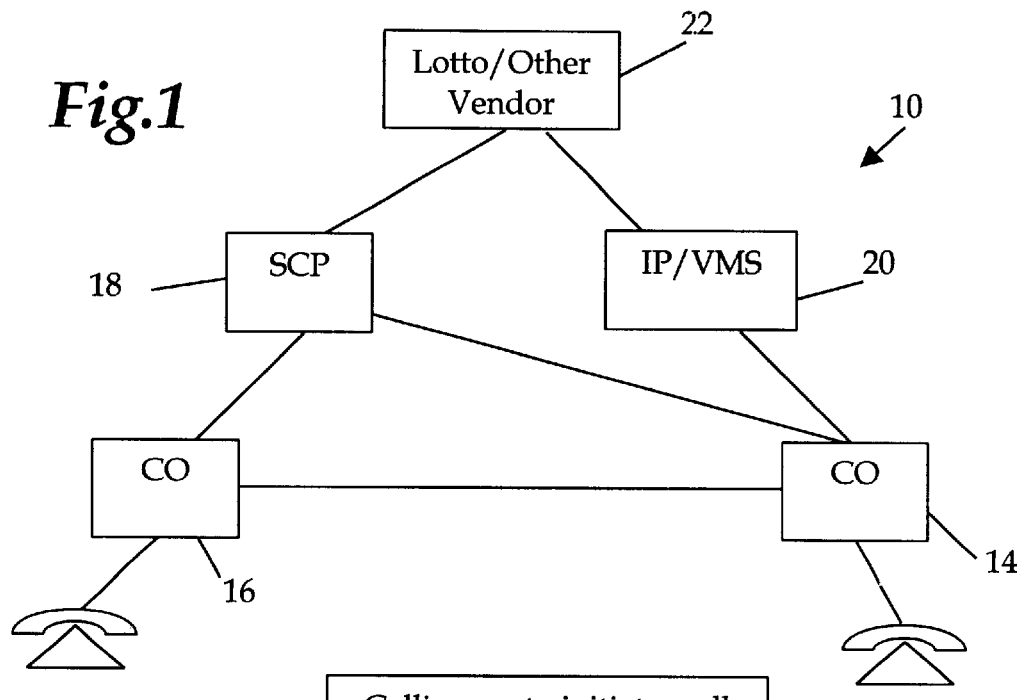
FIG. 1 illustrates a block diagram of a communications system incorporating circuitry to combine voice mail with entertainment.

FIG. 1 illustrates a block diagram of a communications system 10 incorporating circuitry to combine voice mail with entertainment. In FIG. 1, a calling party phone 12 is connected to a called party phone 14 through central offices (CO) 16. An SCP (service control point) 18 is connected to the central offices 16. An IP/VMS (Intelligent Peripheral or Voice Mail System) 20 is coupled to the called party phone, either through a CO 16 or through an internal PBX (private branch exchange) or other telephone system to provide voice messaging. A vendor site 22 is coupled to the IP/VMS 20 and SCP 18. An actual embodiment of the invention could use all or only portions of the circuitry shown in FIG. 1, as described in greater detail hereinbelow. Further, it should be noted that while FIG. 1 describes a basic telecommunications system, the present invention could be used in any messaging system, regardless of whether the communications are made over traditional wireline, wireless, or packet switching (e.g. VOIP—Voice Over Internet Protocol) systems.

Figure 2:
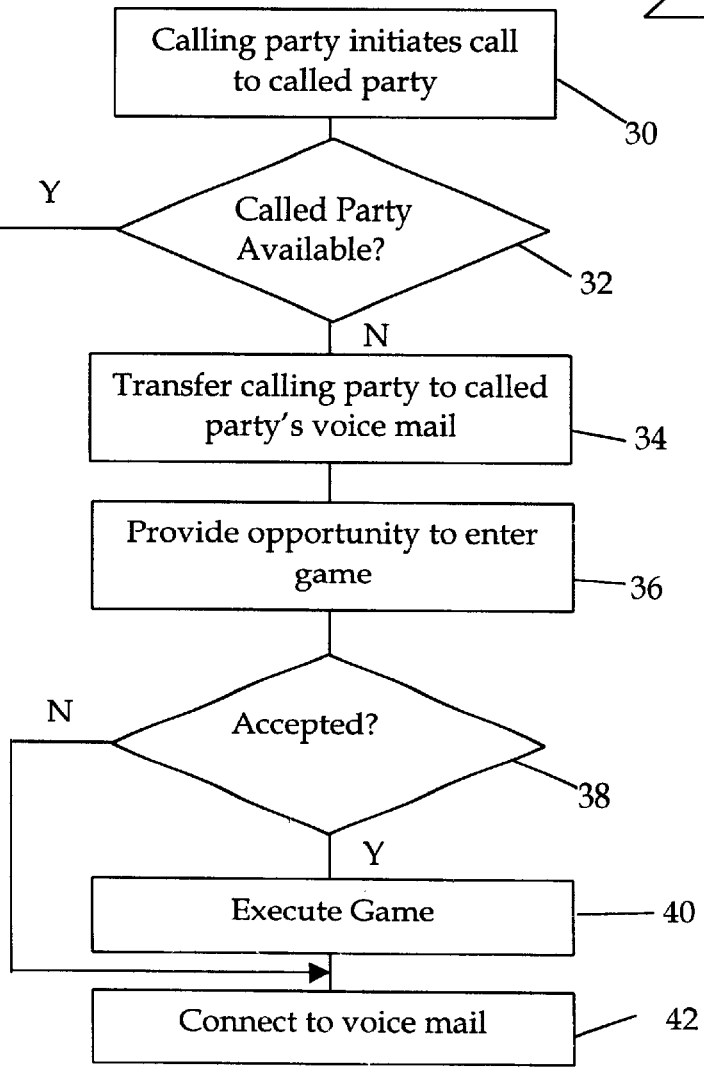
FIG. 2 illustrates a flow diagram illustrating a basic operation for the embodiment shown in FIG. 1.

FIG. 2 illustrates a flow diagram illustrating a basic operation for the embodiment shown in FIG. 1. In step 30, the calling party initiates a call to the called party through phones 12 and 14. If a connection is not made to the called party in step 32, the calling party is transferred to the called party's voice mail in step 34. The public telephone system or PBX could automatically perform the transfer after a set number of rings or a busy signal, or the transfer could be performed manually through a secretary's station or call center.

In step 36, the IP/VMS 20 invites the calling party to enter a game or partake in another form of entertainment. For example, the calling party could be invited to purchase a lottery ticket along with the called party, with the proceeds, if any, to be split between the two participants (or between the called party's company and the calling party, or another suitable arrangement). In step 38, the called party can accept or decline. Typically, the calling party would be prompted with using a recorded or computer generated voice prompt and would respond via DTMF (dual tone modulated frequency) touch-tone keys. Other interfaces, such as a speech recognition interface, could also be used. Such interfaces are well known in the art and are currently used in connection with voice mail systems.

If the calling party does not accept the invitation to engage in a game, the calling party is connected to the called party's voice mailbox in step 42, and may leave a message for the called party. On the other hand, if the calling party accepts the invitation to enter the game, the game is executed in step 40. For the lottery example recited above, the IP/VMS 20 could contact a lottery ticket vendor 22; the vendor 22 would purchase the ticket in the names of the appropriate parties. The connection between the IP/VMS 20 and the vendor 22 could be implemented, for example, through the Internet.

After the game is completed, the calling party then is connected to the called party's voice mailbox, where a message can be left through normal procedures.

The present invention provides entertainment to callers, thus reducing or eliminating the frustration associated with voice mail.

A number of variations could be made on the basic flow shown in FIG. 2. The game could be played by the calling party either before or after the message is left for the called party. The SCP 18 could be used to count number of telephone tag rounds, and change the gaming options to make the game play more interesting. For example, in the first round of telephone tag with a particular calling party, a small prize could be offered, while in the fifth round, a much larger prize could be offered. In a lottery ticket scenario, a "pick-3" lottery ticket (where three numbers or other symbols are selected) could be purchased in the first round of telephone tag, a "pick-4" lottery ticket could be purchased in a second round of telephone tag and a "pick-5" lottery ticket could be picked in a third round of telephone tag. The type of game offered to the calling party could also depend upon the originator calling number. Options for setting game parameters, such as passwords, types of games offered, and so on, could be provided through an Internet connection.

In another alternative implementation, to access the game, the calling parties would need to enter a PIN (Personal Identification Number), password, means of verification.

Figure 3:
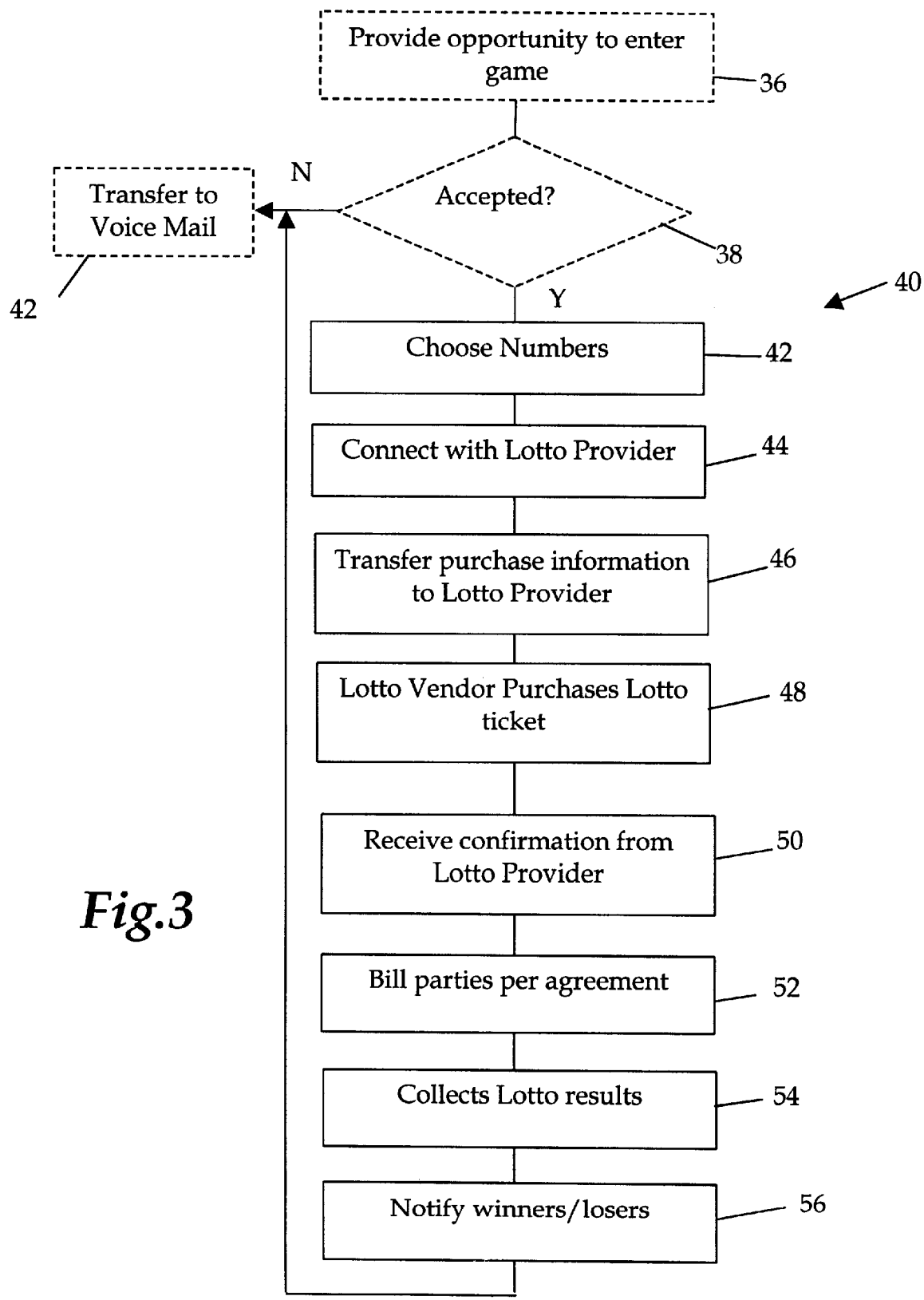
FIG. 3 illustrates a flow chart with more detailed steps in connection with a lottery game, or other game of chance.

FIG. 3 illustrates a flow chart of a first embodiment of the invention with more detailed steps in connection with a lottery game, or other game of chance, which could be executed in step 40 of FIG. 2. For purposes of this embodiment, a lottery game is any game that involves a purchase of a ticket where winners are determined through a random drawing. In a popular form of a lottery game, the participants may chose a plurality of numbers, letters or other symbols. A random drawing of like numbers, letters or other symbols determines the winners of the lottery game.

Prior to step 40, the calling party will have been prompted by the IP/VMS as to whether the calling party wishes to partake in a lottery ticket. If the calling party accepts, th e ticket is purchased in steps 43 through 52.

In step 43, numbers are chosen. Choosing the numbers could be performed by the calling party entering all, some, or none of the acceptable numbers through the touch-tone keypad. For example, each number could be terminated by a "#"; therefore "3" would be input as "3#". Random numbers could be generated by the "*" key. The called party may have previously entered some of the numbers, so that each party has some interest in choosing the number. Alternatively, the Lottery Vendor 22 could randomly choose all the numbers in the next step.

In step 44, a connection is made to the Lottery vendor 22. The connections could be made, for example, through an Internet connection or a dial-up modem. The Lottery vendor could be a third party, a state agency or an in-house computer for purchasing lottery tickets. In step 46, information is uploaded to the Lottery Vendor 22 to specify the particulars of the purchase. In step 48, the ticket is purchased through the proper channels. In step 50, the Lottery Vendor 22 communicates information for verifying the purchase.

Steps 43 through 50 could be implemented in many different ways. In one scenario, the Lottery vendor receives all necessary information in step 46 to purchase the ticket, inform the parties of the purchase and maintains a database of contestants for later notification. In this scenario, the Lottery vendor 22 would receive the telephone number of each party; the calling party's number can be obtained through caller ID and the called party's number could be supplied by the voice mail system. Also, if the calling party or called party were allowed to generate his or her own numbers, this information would be uploaded as well.

The Lottery vendor 22 would purchase one or more lottery tickets, typically through a connection with the state lottery commission. If any or all of the numbers were randomly generated by the state lottery commission (or intermediary), those numbers would be downloaded to the Lottery vendor 22. The Lottery vendor 22 would then store the information in a database, which could be, for example, a database at the Lottery vendor's site, SCP 18, or another third party database. The stored information would include the selected numbers and identifiers associated with the parties who own the ticket. The information could be passed to both the calling party and the called party. For example, the Lottery Vendor 22 could call both the calling party and the called party and leave a message with the numbers picked for the lottery ticket and a unique identifier used to identity the entry.

The Lottery vendor 22 could receive additional information from the IP/VMS 20, which would enhance the playing experience. In U.S. Ser. No. 09/426,315 to Stevens, filed Oct. 25, 1999, entitled "Report-Based Call Routing", which is incorporated by reference herein, a method and system for retrieving information from an IT (information technology) database is discussed. When the calling party is transferred to the IP/VMS 20, information from a database associated with the called party, for example, a scheduling/contacts database (such as OUTLOOK by Microsoft Corporation) maintained by the called party is accessed to obtain additional information about the calling party and/or calling party. In this case, the IP/VMS 20, upon determining the number of the calling party, could look up additional information, such as an email address for the calling party. This information, along with the email address for the called party could be passed to the Lottery vendor 22. The Lottery vendor 22 could use this information to send confirmations by email, which is somewhat more secure than leaving an audio message.

In an alternative embodiment, the Lottery vendor would be used only to purchase the ticket and the communication with the parties would be left to the IP/VMS, along or in conjunction with SCP 18. In this embodiment, after the connection to the Lottery vendor 22 was established in step 44 and any necessary information was passed in step 46 (such as numbers selected by the calling and/or called parties), the Lottery vendor would purchase the ticket and supply the IP/VMS 20 with confirming information, including the chosen numbers and a confirmation number. The IP/VMS 20 would store that information and leave a voice message for the calling and called parties (or and e-mail message). The IT database could also be used to determine which calling parties were authorized to play the game, or for selecting a game.

In step 52, the parties are billed for the ticket. The billing is preferably performed by sending the billing information to the end office associated with the calling and/or called parties. In this way, the costs for participating would be added to the parties' telephone bills. Any number of billing arrangements would be possible, depending upon the situation. For example, the company that employs the called party may purchase a predetermined number of lottery tickets per month on behalf of the calling parties which do not connect. In another situation, the cost of the ticket would be split between the calling party and the called party. The cost of the ticket would then appear on the telephone bill for each party to the phone call. Alternatively, other billing arrangements could be made, for example, by using credit card information.

In step 54, the lottery results information is collected. After the drawing, the winning numbers would be compared to the numbers selected by each participant for that drawing. Winning participants would be notified in step 56, for example by phone, voice mail or e-mail. For small winnings, the amount could be credited to their telephone account; for larger winnings, the amount could be sent to the participants.

Figure 4:
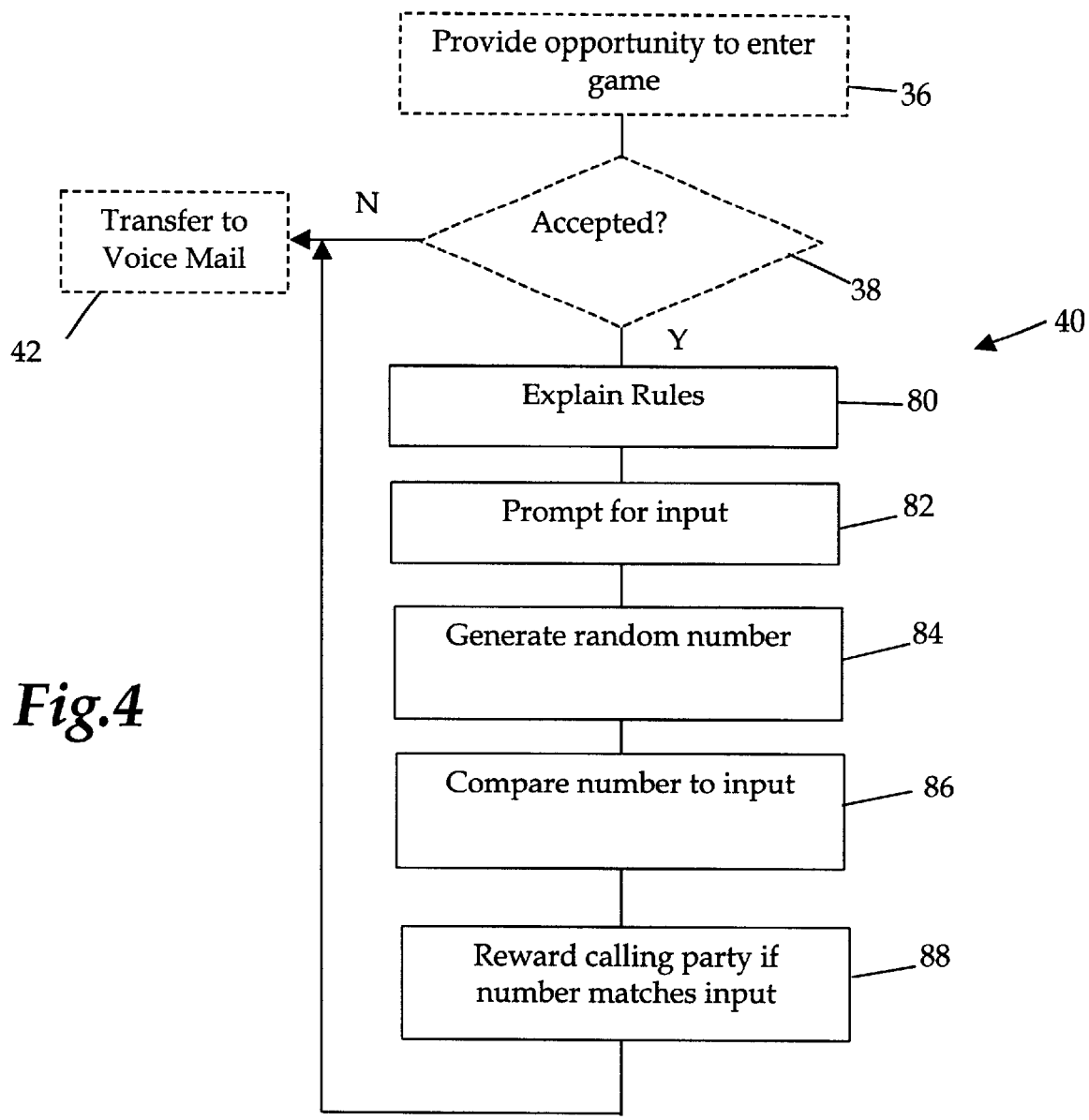
FIG. 4 illustrates a flow chart with more detailed steps in connection with a number guessing game.

FIG. 4 illustrates a flow chart for another game that could be played in connection with in connection with step 40 of FIG. 2. In this embodiment, the calling party participates in a game of chance and is rewarded by a coupon or other prize if he or she wins.

FIG. 4 illustrates steps for an embodiment where step 40 of FIG. 2 is a number guessing game. In this embodiment, after the calling party accepts the opportunity to participate in a game (step 38), the rules of the game are explained in step 80. In this step, the rules could be, for example, "In this game, you will be asked to pick a number. If the number matches a randomly chosen number, you will win a prize." In step 82, the calling party is prompted for a number, such as "Please choose a number between '0' and '99' and press '#'". The calling party would then input a number in step 84. A random number is generated in step 86 (this number could be generated at any time), and the randomly generated number is compared to the calling party's input in step 86. If the number matches, the calling party wins a prize in step 86. For example, the calling party could win a discount coupon for products made by the called party's employer, or other participating vendor. The prize could be sent to the calling party using a number of means—via information in the end office billing system, from information associated with the calling party in the called party's IT system, or by information given by the calling party that is recorded by the IP/VMS at the time of the win. Alternatively, winners could be connected to a live operator to obtain delivery information, prior to being passed to the called party's voice mail.

Figure 5:
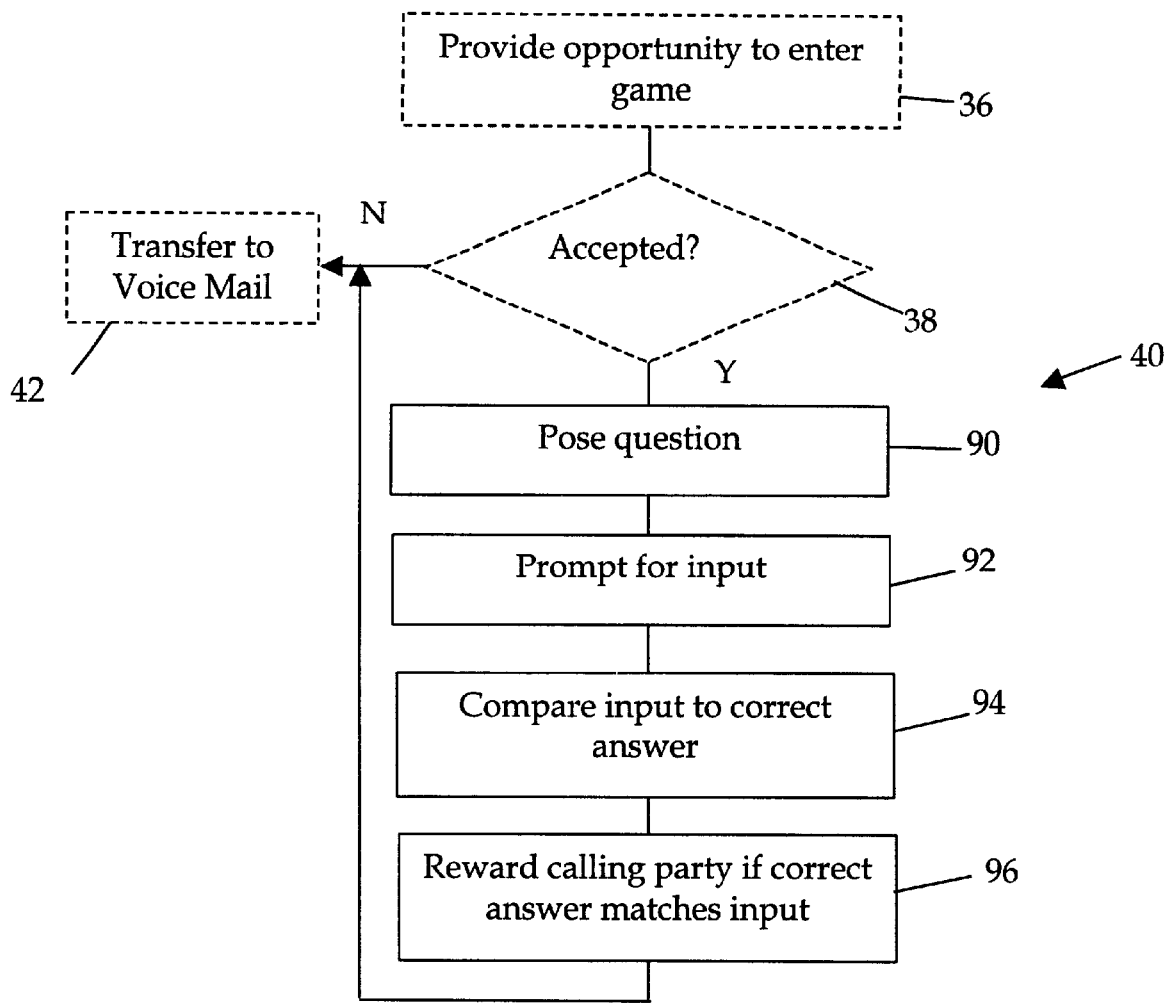
FIG. 5 illustrates a flow chart with more detailed steps in connection with a knowledge game.

FIG. 5 shows a variation of the guessing game of FIG. 4, where a knowledge-based game is executed in step 40 of FIG. 2. In this embodiment, after the calling party accepts the opportunity to participate in a game (step 38), a question is posed in step 90. In this step, the question could be a trivia question, such as "Name the capital of Texas." Alternatively, the question could involve a product or service provided by the called party's company. In step 92, the calling party is prompted for a response, such as "Press '1' for Dallas, '2' for Austin, '3' for Houston and '4' for San Antonio". To make the game more difficult, the calling party could be asked to spell the answer using the touch-tone keys. For the example above, the calling party would need to enter "287846" to spell "Austin". The input by the calling party would then be compared to the correct answer in step 94. If the input matches the correct answer, the calling party wins a prize in step 96. Again, the prize could be transmitted through a number of different means.

The present invention provides significant advantages over the prior art. First, the frustration involved in telephone tag is reduced, because the calling party is rewarded. Second, the invention can be used in connection with advertising through the issuance of coupons or other rewards.

Although the Detailed Description of the invention has been directed to certain exemplary embodiments, various modifications of these embodiments, as well as alternative embodiments, will be suggested to those skilled in the art. For example, the game could be played either after leaving the message or before leaving the message. The invention encompasses any modifications or alternative embodiments that fall within the scope of the Claims.

What is claimed is:

1. A method of providing voice mail, comprising the steps of:
   receiving a call from a calling party to a called party;
   determining whether the call should be passed to a voice mail system associated with the called party;
   determining a number of unsuccessful attempts by said calling party to reach said called party;
   offering the calling party to partake in a form of entertainment, the entertainment being varied based on said number of unsuccessful attempts, where the calling party may either accept of reject the offer, if the call is passed to a voice mail system;
   providing the entertainment, if the calling party accepts; and
   forwarding the calling party to the called party's voice mail.

2. The method of claim 1 wherein said offering step comprises the step of offering the calling party to play a game and the step of providing entertainment comprises the step of playing the game.

3. The method of claim 2 wherein said offering step comprises the step of offering the calling party to participate in a game of chance.

4. The method of claim 3 wherein said step of offering the calling party to participate in a game of chance comprises the step of offering the calling party a chance to purchase a lottery ticket with the called party.

5. The method of claim 4 wherein said step of playing the game comprises the step of comprises the step of purchasing a lottery ticket.

6. The method of claim 5 wherein said step of purchasing a lottery ticket comprises the step of allowing the calling party to choose one or more numbers.

7. The method of claim 5 and further comprising the step of notifying the calling party if the calling party is a winner.

8. The method of claim 2 wherein said offering step comprises the step of offering the calling party a chance to participate in a game for a fee to be charged to the calling party.

9. The method of claim 8 wherein said step of offering the calling party a chance to participate in a game for a fee comprises a step of offering the calling party a chance to participate in a game for a fee to be charged to the caller's telephone account.

10. The method of claim 2 and further comprising the step of awarding a prize to said calling party based on the results of the game.

11. Circuitry for enhancing voice mail, comprising:
    circuitry for receiving a call from a calling party to a called party;
    circuitry for determining a number of unsuccessful attempts by said calling party to reach said called party;
    circuitry for offering the calling party to partake in entertainment, the entertainment being varied based on said number of unsuccessful attempts, if the call is to be passed to a voice mail system, where the offer may be accepted or rejected by the calling party;
    circuitry for providing entertainment to a calling party who accepts an offer for entertainment; and circuitry for forwarding the calling party to the called party's voice mail.

12. The circuitry of claim 11 wherein said offering circuitry comprises circuitry for offering the calling party an opportunity to play a game and said providing circuitry comprises circuitry for playing a game.

13. the voice mail circuitry of claim 12 wherein said offering circuitry comprises circuitry for offering the calling party a chance to participate in a game for a fee to be charged to the calling party.

14. The voice mail circuitry of claim 13 wherein circuitry for offering the calling party a chance to participate in a game for a fee comprises circuitry for offering the calling party a chance to participate in a game for a fee to be charged to the caller's telephone account.

15. The circuitry of claim 12 and further comprising circuitry for awarding a prize to said calling party based on the results of the game.

16. The voice mail circuitry of claim 12 wherein offering circuitry comprises the step of offering the calling party to participate in a game of chance.

17. The voice mail circuitry of claim 16 wherein said offering circuitry comprises circuitry for offering the calling party a chance to purchase a lottery ticket with the called party.

18. The voice mail circuitry of claim 17 wherein said playing circuitry comprises circuitry for purchasing a lottery ticket.

19. The voice mail circuitry of claim 18 wherein said purchasing circuitry comprises circuitry for allowing the calling party to choose one or more numbers.

20. The voice mail circuitry of claim 18 and further comprising circuitry for notifying the calling party if the calling party is a winner.

* * * * *